US012634308B2

(12) United States Patent
Zhou et al.

(10) Patent No.: US 12,634,308 B2
(45) Date of Patent: May 19, 2026

(54) METHOD FOR DETECTING NETWORK ATTACK BASED ON KERNEL OPERATING CHARACTERISTICS OF SOFTWARE SWITCH

(71) Applicants: ZHEJIANG UNIVERSITY, Hangzhou (CN); ZHEJIANG LAB, Hangzhou City (CN)

(72) Inventors: Haifeng Zhou, Hangzhou (CN); Huihao Tan, Hangzhou (CN); Di Wang, Hangzhou (CN); Xiang Chen, Hangzhou (CN); Chunming Wu, Hangzhou (CN); Wenhai Wang, Hangzhou (CN)

(73) Assignees: ZHEJIANG UNIVERSITY, Hangzhou (CN); ZHEJIANG LAB, Hangzhou City (CN)

( * ) Notice: Subject to any disclaimer, the term of this patent is extended or adjusted under 35 U.S.C. 154(b) by 118 days.

(21) Appl. No.: 18/826,156

(22) Filed: Sep. 5, 2024

(65) Prior Publication Data

US 2025/0323925 A1 Oct. 16, 2025

(30) Foreign Application Priority Data

Apr. 11, 2024 (CN) .......................... 202410431631.2

(51) Int. Cl.
*H04L 9/40* (2022.01)
(52) U.S. Cl.
CPC ...... *H04L 63/1416* (2013.01); *H04L 63/1425* (2013.01)
(58) Field of Classification Search
CPC .......................... H04L 63/1416; H04L 63/1425
(Continued)

(56) References Cited

U.S. PATENT DOCUMENTS

| | | | | |
|---|---|---|---|---|
| 10,498,638 B2 * | 12/2019 | Jackson | .................. | H04L 69/22 |
| 12,231,339 B2 * | 2/2025 | Limaye | .................. | H04L 47/11 |

(Continued)

FOREIGN PATENT DOCUMENTS

| | | | | | |
|---|---|---|---|---|---|
| CN | 112929208 A | * | 6/2021 | ......... | H04L 63/1441 |
| CN | 115664754 A | * | 1/2023 | | |
| CN | 116707888 A | * | 9/2023 | ......... | H04L 63/1416 |

OTHER PUBLICATIONS

R. Rahimi et al., "A high-performance OpenFlow software switch," 2016 IEEE 17th International Conference on High Performance Switching and Routing (HPSR), Yokohama, Japan, 2016, pp. 93-99, doi: 10.1109/HPSR.2016.7525645. No. of pp. 7 (Year: 2016).*

(Continued)

*Primary Examiner* — Carl G Colin
*Assistant Examiner* — Komi N. Amevigbe
(74) *Attorney, Agent, or Firm* — Wiersch Law Group

(57) ABSTRACT

A method for detecting network attack based on kernel operating characteristics of a software switch, comprising: collecting kernel operating characteristic data of the software switch during network management and packet forwarding of the software switch, wherein the kernel operating characteristic data of the software switch can reflect characteristic data of a fine-grained operating state of a network; preprocessing the kernel operating characteristic data of the software switch; and inputting the preprocessed kernel operating characteristic data of the software switch into a pre-trained attack detection model to detect a potential attack behavior in a network. The method is applicable to all scenarios where the software switch is applicable, especially a software-defined network and a cloud data center, an industrial Internet, 5G, edge computing based on the software-defined network. More accurate and timely detection (Continued)

collecting kernel operating characteristic data of the software switch by adding monitoring functions to function nodes of key processes such as forwarding, table lookup and controller communication of the software switch, wherein the kernel operating characteristic data of the software switch in a cycle time comprise: kernel mode flow table lookup time, kernel mode flow table hit rate, kernel mode mask cache hash table hit count, kernel mode mask cache hash table lookup count, kernel mode flow table hash table hit count, kernel mode flow table hash table lookup count, flow table command set count, flow table command get count, flow table command del count, kernel execution packet match actions count, kernel datapath upcall packet pass count, kernel datapath upcall latency, kernel upcall message average length, kernel upcall failures count, a number of packets received from a controller, a number of packets sent to the controller, user mode main control execution frequency, datapath upcall processing component execution frequency, user mode flow table lookup time, user mode flow table entries count, user mode flow table hit count, and kernel mode command execution failures count periodically delivering the collected kernel operating characteristic data of relative software switches in a network to an attack detection server specified by the controller for storing and further processing, preprocessing the kernel operating characteristic data of software switches in the attack detection server, training different deep learning based attack detection models for achieving different detection purposes using the preprocessed kernel operating characteristic data of the software switches after the training process is completed, inputting the collected and preprocessed kernel operating characteristic data of relative software switches into a corresponding trained deep learning-based attack detection model in real time after the attack is detected, through the attack detection server or the network controller, immediately requiring those involved software switches to conduct countermeasures for intercepting the attack, and notifying a network manager to effectively respond to the attack at the same time and early warning of potential anomalies and attack behaviors in the network can be implemented.

7 Claims, 7 Drawing Sheets

(58) Field of Classification Search
USPC .......................................................... 713/176
See application file for complete search history.

(56) References Cited

U.S. PATENT DOCUMENTS

| | | | |
|---|---|---|---|
| 12,355,642 B2 * | 7/2025 | Koponen | ............ H04L 49/3018 |
| 2018/0241670 A1 * | 8/2018 | Shin | ....................... G06F 16/353 |
| 2025/0323925 A1 * | 10/2025 | Zhou | ................... H04L 63/1416 |

OTHER PUBLICATIONS

S. Ahn, H. Yi, Y. Lee, W. R. Ha, G. Kim and Y. Paek, "Hawkware: Network Intrusion Detection based on Behavior Analysis with ANNs on an IoT Device," 2020 57th ACM/IEEE Design Automation Conference (DAC), San Francisco, CA, USA, 2020, pp. 1-6, doi: No. of pp. 6 (Year: 2020).*

* cited by examiner collecting kernel operating characteristic data of the software switch by adding monitoring functions to function nodes of key processes such as forwarding, table lookup and controller communication of the software switch, wherein the kernel operating characteristic data of the software switch in a cycle time comprise: kernel mode flow table lookup time, kernel mode flow table hit rate, kernel mode mask cache hash table hit count, kernel mode mask cache hash table lookup count, kernel mode flow table hash table hit count, kernel mode flow table hash table lookup count, flow table command set count, flow table command get count, flow table command del count, kernel execution packet match actions count, kernel datapath upcall packet pass count, kernel datapath upcall latency, kernel upcall message average length, kernel upcall failures count, a number of packets received from a controller, a number of packets sent to the controller, user mode main control execution frequency, datapath upcall processing component execution frequency, user mode flow table lookup time, user mode flow table entries count, user mode flow table hit count, and kernel mode command execution failures count

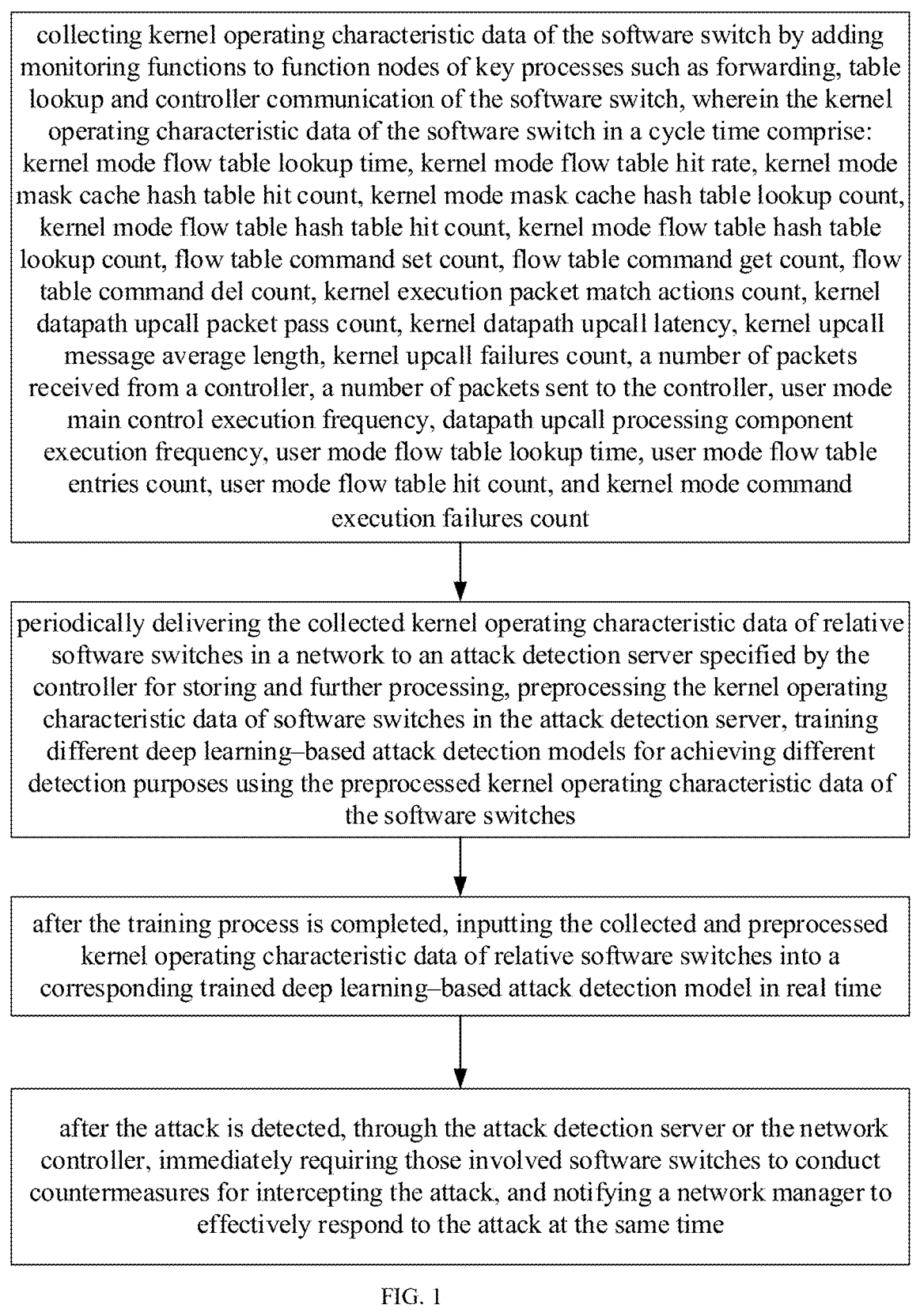

↓ periodically delivering the collected kernel operating characteristic data of relative software switches in a network to an attack detection server specified by the controller for storing and further processing, preprocessing the kernel operating characteristic data of software switches in the attack detection server, training different deep learning–based attack detection models for achieving different detection purposes using the preprocessed kernel operating characteristic data of the software switches

↓ after the training process is completed, inputting the collected and preprocessed kernel operating characteristic data of relative software switches into a corresponding trained deep learning–based attack detection model in real time

↓ after the attack is detected, through the attack detection server or the network controller, immediately requiring those involved software switches to conduct countermeasures for intercepting the attack, and notifying a network manager to effectively respond to the attack at the same time

FIG. 1

METHOD FOR DETECTING NETWORK ATTACK BASED ON KERNEL OPERATING CHARACTERISTICS OF SOFTWARE SWITCH

CROSS-REFERENCE TO RELATED APPLICATIONS

The present application claims priority to Chinese Patent Application No. 202410431631.2, filed on Apr. 11, 2024, the content of which is incorporated herein by reference in its entirety.

TECHNICAL FIELD

The present disclosure relates to the technical field of computer network security, and in particular, to a method for detecting network attack based on kernel operating characteristics of a software switch.

BACKGROUND

Network functions virtualization (NFV) uses an IT virtualization technology to integrate functions of existing network devices into standard servers, storage devices, switches, etc., and implements network functions in a form of software, thereby replacing private, dedicated and closed network element devices in a current network. These standard devices may be located in data centers, network nodes, and customer premises networks. With the rapid development of cloud computing, 5G, mobile edge computing, a software-defined network, hardware acceleration and other technologies in recent years, an NFV technology has become increasingly mature and has entered a period of rapid development.

Software-defined network (SDN), as an implementation approach to the NFV, is a novel network architecture that subversively separates tightly coupled control plane and data plane in a traditional network, and transforms a distributed control implemented by routers and other devices in the traditional network into a centralized control of the control plane. Network programmability brought by the centralized control greatly improves flexibility and scalability of the network. Network operators may flexibly configure resources and deploy policies through the SDN, greatly reducing network operation and maintenance costs. Therefore, in recent years, the SDN has been widely used in many scenarios such as cloud data centers, 5G, edge computing, and industrial Internet.

Similarly, software switches are further widely used as NFV for implementing virtual routing and switching. One of the most representative software switches is Open vSwitch (OVS), that is, an open virtual switch standard. The OVS is a production-quality multilayer virtual switch standard under an open source Apache 2.0 license, which supports virtualization technologies such as KVM and Xen, and is currently the most popular and widely used open source software switch. It supports an SDN OpenFlow protocol, is implemented based on a platform-agnostic C language, easy to transplant, and wide in use, has received widespread attention since its birth, and has now basically become the de facto standard of an open source SDN infrastructure layer. The underlying implementation of a network component Neutron of a mainstream OpenStack cloud computing framework used in the industry is to use the OVS as a virtual switch, and the OVS is currently widely deployed in network virtualization environments such as cloud data center networks. In addition, there are other open source virtual routing and switch software such as Linux Bridge, Lagopus, Vale/Netmap, BIRD, Quagga, and VyOS.

With the development and cross-integration of deep learning, artificial intelligence, and network security technologies, many network attack detection methods based on a deep learning/artificial intelligence technology have emerged for network traffic, but characteristics used are usually macroscopic and coarse-grained, such as the number of receiving/sending packets, a source IP address/port entropy, and a degree of asymmetry in the number of receiving and sending packets, resulting in low accuracy and efficiency of current network attack detection.

SUMMARY

Aiming at the deficiency of the prior art, the present disclosure provides a method for detecting network attack based on kernel operating characteristics of a software switch.

According to a first aspect of an embodiment of the present disclosure, a method for detecting network attack based on kernel operating characteristics of a software switch is provided, and the method includes:

Collecting kernel operating characteristic data of the software switch. The kernel operating characteristic data of the software switch in a cycle time include: a kernel mode flow table lookup time, kernel mode flow table hit rate, kernel mode mask cache hash table hit count, kernel mode mask cache hash table lookup count, kernel mode flow table hash table hit count, kernel mode flow table hash table lookups, flow table command set count, flow table command get count, flow table command del count, kernel execution packet match actions count, kernel datapath upcall packet pass count, kernel datapath upcall latency, kernel upcall message average length, kernel upcall failures count, a number of packets received from a controller, a number of packets sent to a controller, user mode main control execution frequency, datapath upcall processing component execution frequency, user mode flow table lookup time, user mode flow table entries count, user mode flow table hit count, and kernel mode command execution failures count.

Periodically delivering the collected kernel operating characteristic data of relative software switches in a network to an attack detection server specified by the controller for storing and further processing.

Preprocessing the kernel operating characteristic data of the software switches in the attack detection server, including: calculating the kernel operating characteristic data using feature calculation formula, integrating features of multiple dimensions into a unified time scale to obtain second-level feature data, and storing persistently the calculated second-level feature data in a database.

Training different deep learning-based attack detection models for achieving different detection purposes using the preprocessed kernel operating characteristic data of the software switches.

After the training process is completed, inputting the collected and preprocessed kernel operating characteristic data of relative software switches into a corresponding trained deep learning-based attack detection model in real time. Owing to these extra effective data, the trained deep learning-based attack detection model is more precise and fast to detect an attack when compared with traditional detection models.

After the attack is detected, through the attack detection server or the network controller, immediately requiring those involved software switches to conduct countermeasures for intercepting the attack, and notifying a network manager to effectively respond to the attack at the same time.

According to a second aspect of an embodiment of the present disclosure, an electronic device is provided, including a memory and a processor, and the memory is coupled with the processor. The memory is configured to store program data, and the processor is configured to execute the program data to implement the above network attack detection method based on the kernel operating characteristics of the software switch.

According to a third aspect of an embodiment of the present disclosure, a non-transitory computer-readable storage medium is provided, storing a program thereon, and the program, when executed by a processor, implements the above network attack detection method based on the kernel operating characteristics of the software switch.

According to a fourth aspect of an embodiment of the present disclosure, a computer program product is provided, including a computer program/instruction, and the computer program/instruction, when executed by a processor, implements the above method for detecting network attack based on the kernel operating characteristics of the software switch.

Compared with the prior art, the present disclosure has the following beneficial effects:

The present disclosure provides the method for detecting the network attack based on the kernel operating characteristics of the software switch. First, the method acquires the kernel operating characteristic data of the software switch, which provides detailed operation characteristics at the function level granularity. This fine-grained characteristic data covers the operation process of the software switch, including key links such as data packet processing, forwarding decisions and resource usage. Next, the method inputs these characteristic data into an attack detection model, and the attack detection model is trained to identify subtle differences between normal operating modes and potential attack behaviors. Through this meticulous feature capture, the attack detection model can more accurately and timely identify network anomalies and attack behaviors, thereby enhancing network security protection capabilities. Ultimately, this method aims to achieve real-time monitoring and anomaly detection of software switches and improve the overall security of network systems.

BRIEF DESCRIPTION OF DRAWINGS

In order to explain technical solutions in embodiments of the present disclosure more clearly, accompanying drawings that need to be used in descriptions of the embodiments will be briefly introduced below. Apparently, the accompanying drawings in the following descriptions are merely some embodiments of the present disclosure, and for those of ordinary skill in the art, on the premise of no creative work, other accompanying drawings may further be obtained from these accompanying drawings.

FIG. 1 is a flowchart of a method for detecting network attack based on kernel operating characteristics of a software switch provided by an embodiment of the present disclosure.

DESCRIPTION OF EMBODIMENTS

Technical solutions in embodiments of the present disclosure will be clearly and completely described below in conjunction with accompanying drawings in the embodiments of the present disclosure. Obviously, the described embodiments are only part of the embodiments of the present disclosure, not all of them. Based on the embodiments in the present disclosure, all other embodiments obtained by those of ordinary skill in the art without creative work shall fall within the protection scope of the present disclosure.

It needs to be noted that the following embodiments and features in implementations may be combined with each other in the case of not conflicting.

Figure 2:
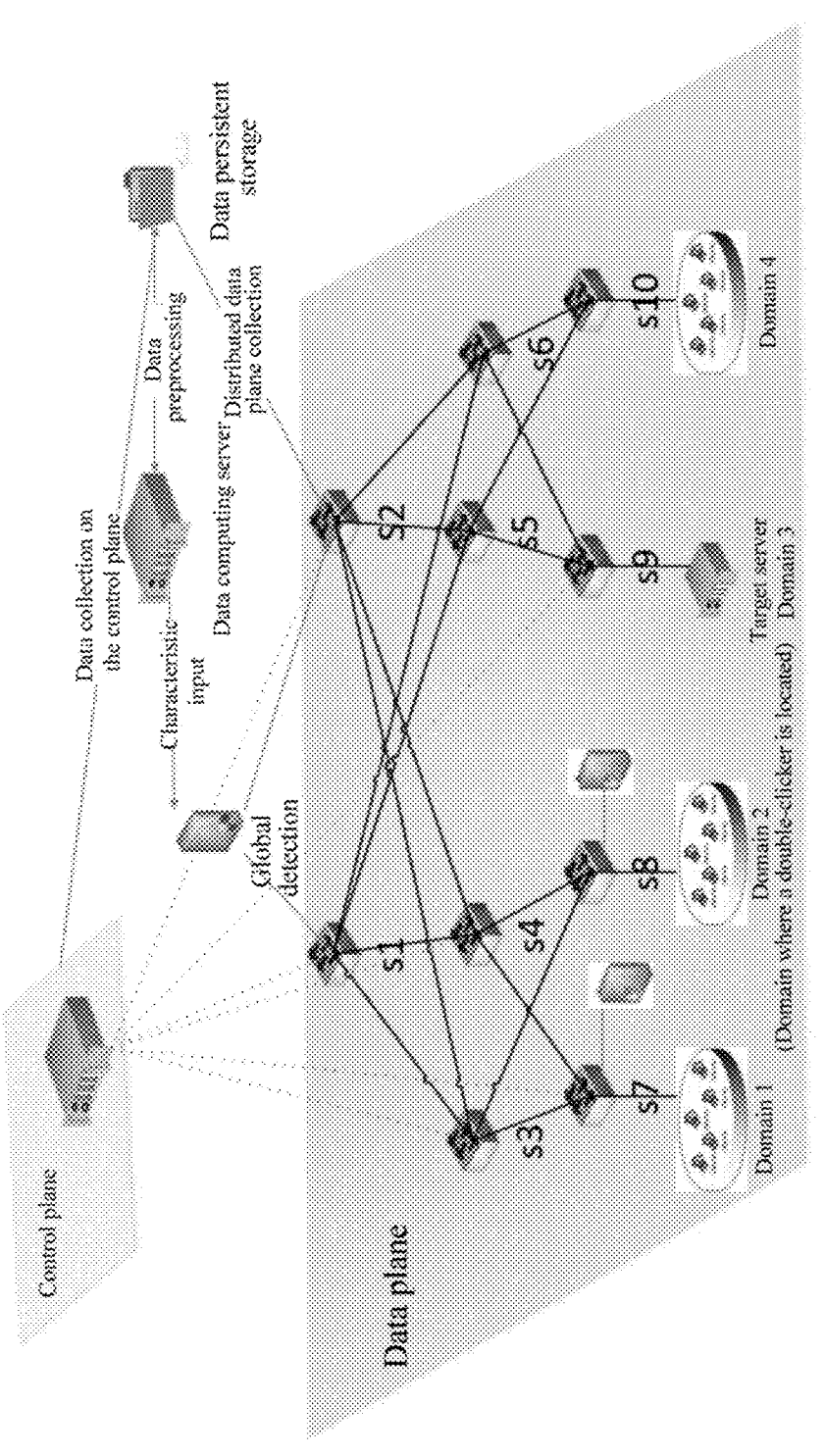
FIG. 2 is a schematic architectural diagram of a method for detecting network attack based on kernel operating characteristics of a software switch provided by an embodiment of the present disclosure.

As shown in FIG. 1 and FIG. 2, an embodiment of the present disclosure provides a method for detecting network attack based on kernel operating characteristics of a software switch. In the example, an OVS software switch is selected as the software switch. The method includes:

Step S1, collecting kernel operating characteristic data of the software switch. The kernel operating characteristic data of the software switch include the following:

(1) Kernel Mode Flow Table Lookup Time

In an embodiment, the kernel mode flow table lookup time refers to the time taken for each packet to lookup a kernel mode flow table within a kernel datapath per unit of time. Each packet that arrives at the OVS needs to query the kernel mode flow table to determine how to process a current packet, and then execute operations such as forwarding and dropping. The kernel mode flow table adopts a multi-level cache design framework, and a table query process of this architecture is suitable for a CPU locality principle, that is, continuous OVS packets make table queries very fast because of the existence of a flow table cache. At the same time, the size of the kernel flow table further affects a table query speed to a certain extent. In general, the time for the packet to query the kernel mode flow table is relatively low and tends to be stable.

(2) Kernel Mode Flow Table Hit Rate

In an embodiment, the kernel mode flow table hit rate refers to the number of packets that hit the kernel mode flow table within the kernel datapath per unit of time. When arriving at a data plane, the packet performs a kernel mode table query. For the packet that hits the kernel mode flow table, the packet does not need to be uploaded to a user mode and is directly forwarded in a kernel mode, so as to avoid a copy of the packet from the kernel mode to the user mode and much system call time, and thus a processing speed of the packet is greatly increased. The characteristic can reflect a hit condition of the kernel mode flow table, the number of packets forwarded to the user mode, and a working status of the OVS. In general, the eigenvalue fluctuates with network conditions, but the range of fluctuations is limited.

(3) Kernel Mode Mask Cache Hash Table Hit Count

In an embodiment, the kernel mode mask cache hash table hit count refers to the number of hits in a kernel mode mask cache hash table (mask_cache) for the packets per unit of time. In the process of querying the kernel mode flow table, the packet first needs to find a mask corresponding to the packet in the mask hash table. The corresponding mask is used for a fuzzy matching search, and such a kernel multi-level table search process can make the kernel flow table more fault-tolerant. The mask cache hash table uses a Linux kernel skb_hash function to generate a hash value for skb_buff of the packet. A hash table search is performed using lower eight bits of a hash value, and last eight bits are used for hashing if a conflict occurs. Therefore, this number of hits to the hash table can reflect the change and distribution of a network header quadruple of the passing packet. In a normal network environment, the eigenvalue fluctuates with the header quadruple (a source/destination IP address and a source/destination port) of a network protocol, but the overall number of table search hits is relatively stable.

(4) Kernel Mode Mask Cache Hash Table Lookup Count

In an embodiment, the kernel mode mask cache hash table lookup count refers to the number of lookups in the kernel mode mask cache hash table (mask_cache) for the packets per unit of time. The statistical principle and position of the characteristic are similar to those of kernel mode mask cache hash table hit count. Through the total number of searches and the number of hits therein, a hit rate, a MISS rate, etc. of the mask cache hash table may be computed respectively, and the two indicators may be combined to reflect search and hit conditions of the kernel mode mask cache hash table.

(5) Kernel Mode Flow Table Hash Table Hit Count

In an embodiment, the kernel mode flow table hash table hit count refers to the number of hits in a kernel mode flow table hash table (datapath_flow_hash) for the packets per unit of time. After the mask of the packet is found in the process of querying the kernel mode flow table, a bitwise & operation is performed on the packet mask and the header quadruple of the packet. An obtained result is shifted, and then used as an index of the kernel mode flow table hash table (which stores flow table entries). The hash table uses a chain structure to handle conflicts. The characteristic can reflect the changes in the flow that passes through the OVS. In a normal network environment, the eigenvalue fluctuates in a small range for a certain period of time.

(6) Kernel Mode Flow Table Hash Table Lookups

In an embodiment, the kernel mode flow table hash table lookup count refers to the number of lookups to the kernel mode flow table hash table for the packets per unit of time. The statistical principle and position of the characteristic are similar to those of kernel mode flow table hash table hit count. Through the total number of searches to a flow table hash table and the number of hits therein, a hit rate, a MISS rate, etc. of the kernel mode flow table may be computed respectively, the two indicators may be combined to reflect search and hit conditions of the kernel mode flow table hash table, and then a matching condition of the flow table in a certain period of time is reflected.

(7) Flow Table Command Set Count

In an embodiment, the flow table command set count refers to the number of times the OVS executes flow table setting operations per unit of time. When a control plane senses a network change due to a change in a network state or its own control plane module senses the network change, an OVS user mode program uses a netlink mechanism to send commands related to controls of the flow table to the kernel mode, the most common of which is to set, obtain, and delete the flow table. When a controller topology discovery function or other network sensing modules want to modify the flow table, the flow table is modified by the flow table command sets. Therefore, flow table command set count may reflect the number and frequency of changes to the flow table on the data plane by the control plane per unit of time, and is used for measuring network fluctuation conditions.

(8) Flow Table Command Get Count

In an embodiment, the flow table command get count refers to the number of times the OVS executes flow table getting operations per unit of time. The statistical principle and position of the characteristic are similar to those of flow table command set count. The difference is that the control plane calls a flow table getting command interface more often, which is more frequent than modifying the flow table. Therefore, in general, flow table command get count is greater than flow table command set count.

(9) Flow Table Command Del Count

In an embodiment, the flow table command del count refers to the number of times the OVS executes flow table deleting operations per unit of time. The statistical principle and position of the characteristic are similar to those of flow table command set count. The difference is that only in special cases, for example, a cache of the flow table overflows or flow table entries of the flow table age, a controller uses a flow table deletion command interface to delete the flow table and the flow table entries in the OVS. In general, flow table command del count is much smaller than flow table command set count and flow table command get count.

(10) Kernel Execution Packet Match Actions Count

In an embodiment, the kernel execution packet match actions count refers to the number of times the OVS kernel executes packet matching actions per unit of time. When the packet enters into the kernel mode to query the flow table and hit it, a corresponding set of packet processing actions needs to be executed, such as dropping and forwarding. All execution actions have a unified function interface in the OVS, and the number of times the packet is processed by a particular action is counted on the interface. The characteristic may reflect the number and rate of packets processed by the OVS per unit of time.

(11) Kernel Datapath Upcall Packet Pass Count

In an embodiment, the kernel datapath upcall packet pass count refers to the number of packets transmitted by the OVS kernel through the datapath upcall per unit of time. When the packet queries the table in the kernel mode and MISS occurs, the packet is processed by sending an upcall packet to the user mode, and the packet contains the data content of a missed kernel flow table. An OVS user mode process searches for corresponding flow table entries in the user mode flow table. The characteristic may reflect the number of times of MISS of the kernel mode flow table queried in the packet, and may further indirectly reflect the number of packet_in uploaded to the controller. When a large number of new data flows suddenly appear in the network, the eigenvalue rises rapidly.

(12) Kernel Datapath Upcall Latency

In an embodiment, the kernel datapath upcall latency refers to an average delay of the OVS kernel in transmitting packets through the datapath upcall per unit of time. In general, the eigenvalue remains unchanged, but it will fluctuate significantly when a large amount of sudden traffic appears to cause abnormal sending of the kernel on the data plane.

(13) Kernel Upcall Message Average Length

In an embodiment, the kernel upcall message average length refers to an average length of packets transmitted by the OVS kernel through the datapath upcall per unit of time. Because the packet uploaded through the datapath upcall contains all contents of the packet that does not match the kernel mode flow table, when a large number of unknown packets arrive and miss the kernel flow table, all the packets will be sent to the user mode process, so that when a large number of packets with only the size of a TCP header are sent, low-speed DDOS attack traffic for TCP full connections, TCP semi-connections, etc. may be quickly identified through the eigenvalue.

(14) Kernel Upcall Failures Count

In an embodiment, the kernel upcall failures count refers to the number of times the upcall packets sent from the kernel mode to the user mode fail to be sent per unit of time. Under normal circumstances, packets sent by the kernel to the datapath upcall hardly fail in execution. If it is found that the number of failures is too high, OVS reaches a performance bottleneck, and meanwhile it may be caused by a large amount of sudden traffic impacting a network forwarding device.

(15) Number of Packets Received from a Controller

In an embodiment, the number of packets received from a controller refers to the number of instruction packets received by the OVS from the control plane per unit of time, including all packet_out packets. The eigenvalue may reflect the interaction condition between the OVS and the controller, and at the same time reflect the frequency of the controller's control instructions to the OVS.

(16) Number of Packets Sent to a Controller

In an embodiment, the number of packets sent to a controller refers to the number of packets sent by the OVS to the controller per unit of time, including all packet_in packets. Only if a packet does not match the kernel mode flow table, and does not match the user mode flow table when sent to the user mode, the packet is further sent to the controller through packet_in. Therefore, the eigenvalue may reflect a MISS condition of all flow tables on the data plane, and can describe the degree of IP dispersion and distribution.

(17) Execution Frequency of a Vswitch Control

In an embodiment, the execution frequency of a vswitch control refers to an execution frequency of a main process of the main control vswitch in the user mode per unit of time. This is a relatively comprehensive function-level indicator, and the main process of the vswitch coordinates all interfaces in the user mode, and the characteristic may well reflect the current processing performance of the entire OVS. If the main process of the vswitch is executed too frequently or too quickly, a large number of packets need to be processed and forwarded, and a large number of packets need to be sent to the user mode, and even sent to the controller. Therefore, the characteristic is a comprehensive indicator that reflects a current processing state of the switch.

(18) Datapath Upcall Processing Component Execution Frequency

In an embodiment, the datapath upcall processing component execution frequency refers to an execution frequency of a management process for sending from the kernel mode to the user mode per unit of time. When the packet is sent from the kernel mode to the user mode through the datapath upcall, the packet is uniformly taken over and processed by a datapath upcall processing process. The higher the execution frequency of the processing process per unit of time, the faster the packet is sent and successfully processed.

(19) User Mode Flow Table Lookup Time

In an embodiment, the user mode flow table lookup time refers to average query time of the user mode flow table per unit of time. When the packet is missed in the kernel mode flow table, it is sent to a complete flow table in the user mode for matching, and forwarding and processing manners of the packet are determined. The longer the query time in the user mode, the slower a matching speed of entries of the user mode flow table, which may be because too many flow table entries are newly added to the user mode or a tuple of the sent packet is abnormal.

(20) User Mode Flow Table Entries Count

In an embodiment, the user mode flow table entries count refers to an average number of flow table entries in the user mode flow table per unit of time. All the flow table entries in the user mode flow table are delivered and controlled by the controller, one part of which are fixed static routing entries of the network, and the other part is delivered through packet_out according to forwarding logic of the controller, such as a shortest path algorithm. Therefore, user mode flow table entries count is an important indicator to measure the distribution of network IP addresses. If a large number of forged IPs are sent to the controller after table query MISS, and the controller calculates a shortest path according to a destination IP and sends the flow table, a large number of forged source IPs will cause the controller to deliver a large number of flow table entries to the OVS, resulting in a sharp increase in the eigenvalue. Therefore, the characteristic is one of the comprehensive indicators to measure the degree of distribution and dispersion of network traffic.

(21) User Mode Flow Table Hit Count

In an embodiment, the user mode flow table hit count refers to the number of hits of the user mode flow table per unit of time. If the eigenvalue is large, it means that the concentration of traffic is high, and vice versa, the traffic is more divergent.

(22) Kernel Mode Command Execution Failures Count

In an embodiment, the kernel mode command execution failures count refers to the number of execution failures of commands sent from the user mode to the kernel mode per unit of time. Generally speaking, commands to modify, delete, and get flow tables sent from the user mode to the kernel mode are rarely executed abnormally. The eigenvalue is increased only when the OVS kernel state is abnormal. Therefore, kernel mode command execution failures count and kernel upcall failures count may be used to comprehensively measure the degree of abnormality of the OVS kernel state.

Step S2, periodically delivering the collected kernel operating characteristic data of relative software switches in a network to an attack detection server specified by the controller for storing and further processing, preprocessing the kernel operating characteristic data of software switches in the attack detection server, training different deep learning-based attack detection models for achieving different detection purposes using the preprocessed kernel operating characteristic data of the software switches.

Step S3, after the training process is completed, inputting the collected and preprocessed kernel operating characteristic data of relative software switches into a corresponding trained deep learning-based attack detection model in real time. Owing to these extra effective data, the trained deep learning-based attack detection model is more precise and fast to detect an attack when compared with traditional detection models Step S4, after the attack is detected, through the attack detection server or the network controller, immediately requiring those involved software switches to conduct countermeasures for intercepting the attack, and notifying a network manager to effectively respond to the attack at the same time.

Further, the attack detection model includes, but is not limited to, a convolutional neural network (CNN), a long short-term memory network (LSTM), and a recurrent neural network (RNN).

A process of collecting characteristic data related to a kernel datapath upcall process includes the following.

Figure 3:
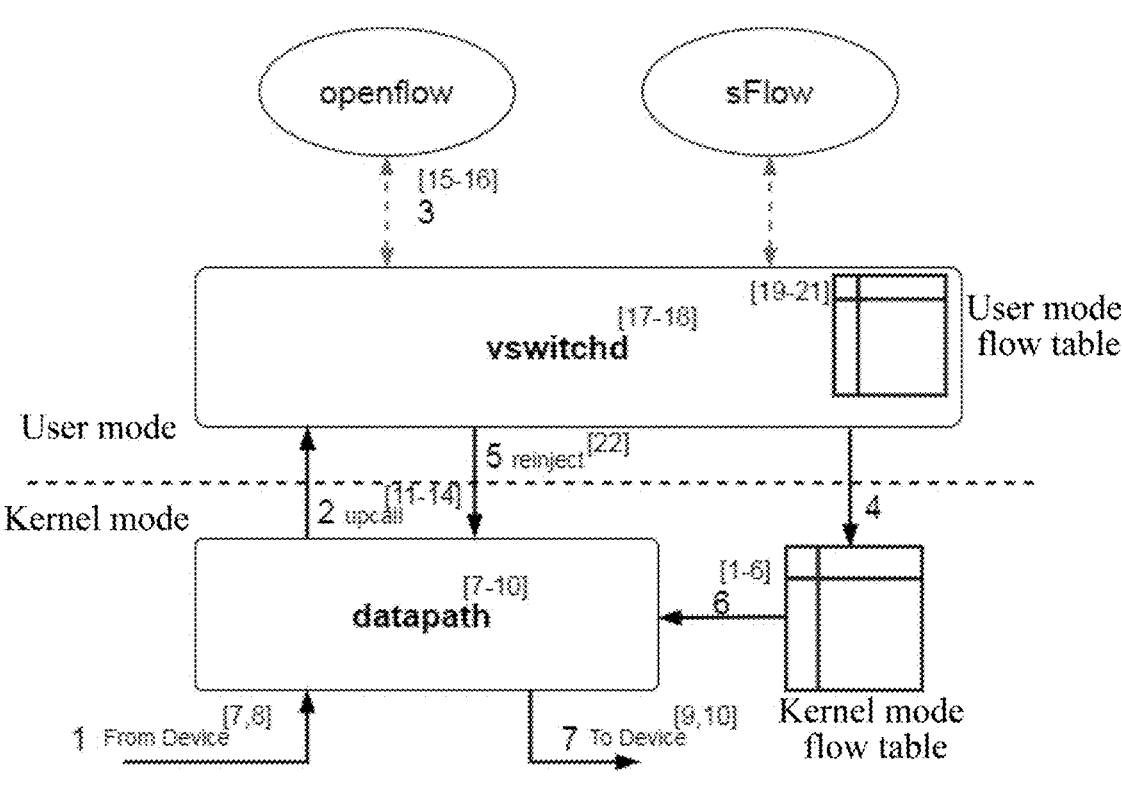
FIG. 3 is a schematic diagram of a system architecture of an OVS software switch and collection positions of kernel operating characteristic data provided by an embodiment of the present disclosure.

As shown in a "2" process in FIG. 3, average delay statistics of the datapath upcall for the packet per unit of time are implemented by the kernel datapath upcall latency. The datapath upcall process is mainly used to implement a communication of the unmatched packet in the kernel mode to the vswitchd process in the user mode through a Linux Generic Netlink mechanism. An information collection system expands the packet content before the datapath upcall of the kernel OVS packet for a monitoring target and adds a content of a current timestamp. After the packet arrives at the user mode process, the expanded and added contents are read and calculated. Finally, an expansion field of the packet is restored to an original data format state of the packet. Through this method, delay time of a target packet passing through the datapath upcall is counted.

Figure 4:
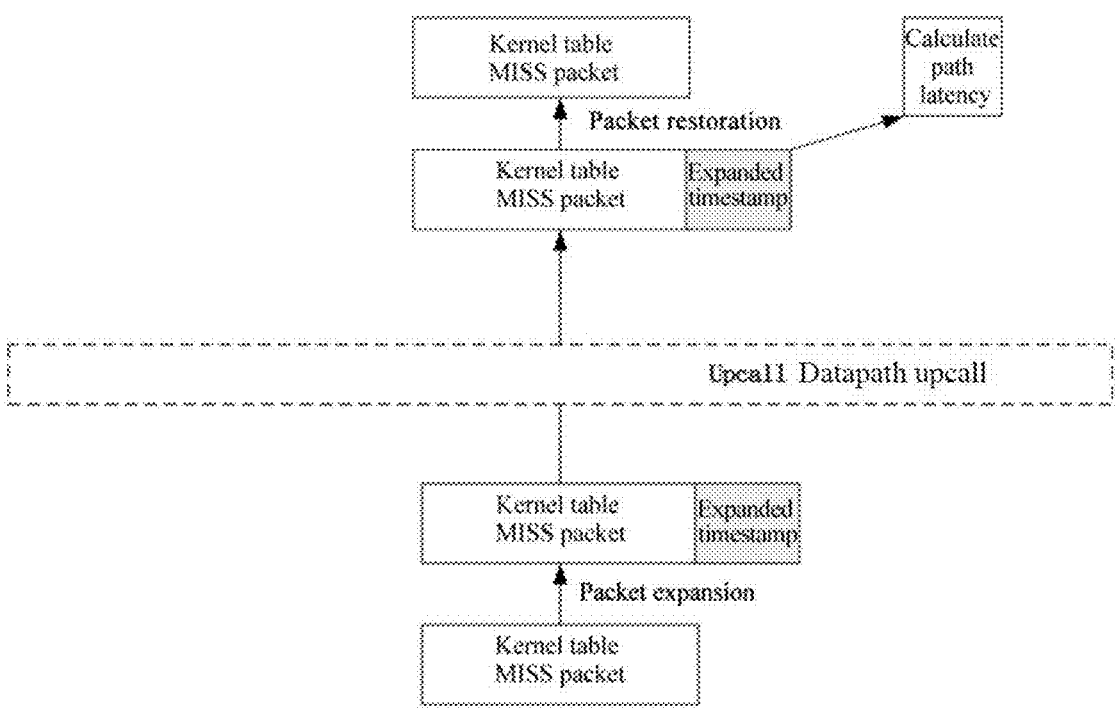
FIG. 4 is a flowchart of collection implementation of a characteristic of kernel datapath upcall latency provided by an embodiment of the present disclosure.

A method of FIG. 4 may effectively solve the problem of time synchronization at a packet level of the kernel mode and the user mode. Due to the consideration of operating system security of Linux, the kernel mode and the user mode cannot share variables in real time, and can only communicate through an IPC, which further makes it difficult to collect the kernel datapath upcall latency. As shown in FIG. 4, the packet itself is used to transmit label data, and then the packet is split and restored, so as to implement the collection of the kernel datapath upcall latency. The implementation process of this design idea uses a field expansion mechanism in a Generic Netlink communication mechanism, and the OVS further uses this mechanism in the packet communication of the datapath upcall, so the collection method shown in FIG. 4 continues this mechanism from the implementation perspective and performs secondary development and implementation based on this.

Figure 5:
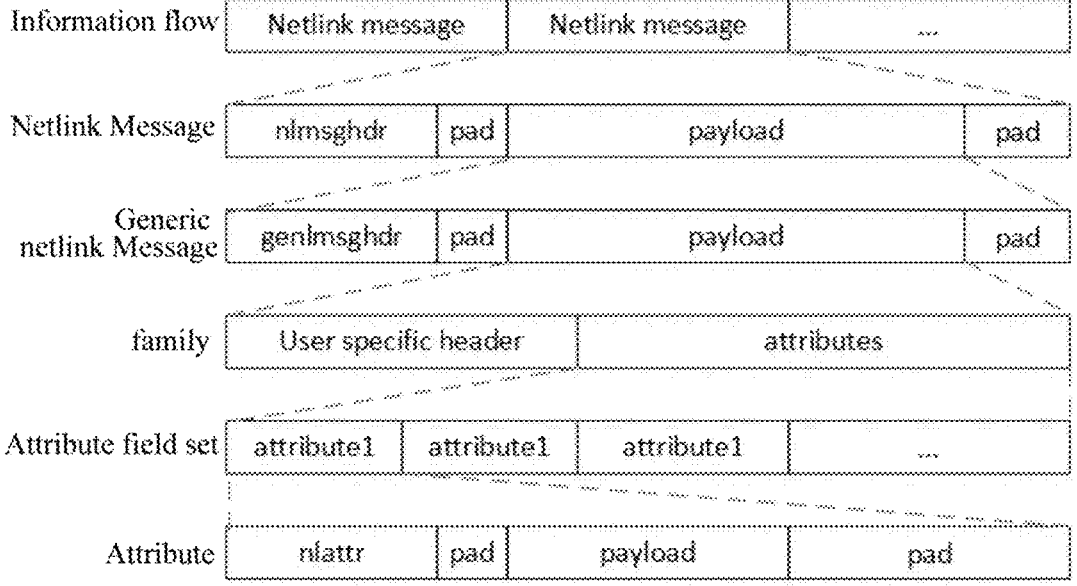
FIG. 5 is a schematic diagram of a format of a packet of a datapath upcall provided by an embodiment of the present disclosure.

The OVS encapsulates the packets of matching MISS with the kernel mode flow table into a data format shown in FIG. 5 (see Table 1 for meanings of fields), and transmits the packets through a netlink channel. The packets are divided into five levels, and the actual packets on the data plane, i.e., data lost by kernel matching, are encapsulated in attribute fields. One or more attribute fields are encapsulated in a user-defined family message. The attribute fields of the datapath upcall specifically include packet content, packet index, key value, etc.

TABLE 1

| | | Field meaning table for datapath upcall data packet |
|---|---|---|
| Serial number | Field attribute | Field meaning |
| 1 | nlmsghdr | netlink header, record length, type, etc. |
| 2 | payload | Data part of the communication |

TABLE 1-continued

| | | Field meaning table for datapath upcall data packet |
|---|---|---|
| Serial number | Field attribute | Field meaning |
| 3 | pad | Data padding, for data alignment |
| 4 | genlmasghdr | Expansion header, recording the corresponding command number |
| 5 | family | Distinguish between different Generic Netlink |

To implement the collection of the kernel datapath upcall latency, a custom attribute field needs to be added to the packet, and the content is the current timestamp of the packet at an interface of the datapath upcall in the kernel mode. However, this modification is not enough, because there are various mechanisms to check and verify the packet during a kernel transmission process, and a packet size and other contents further need to be modified in order to pass the verification of a verification mechanism because the original data encapsulation is damaged due to the addition of new custom attributes. The above process is divided into the following four key implementation steps. Firstly, a size of a destination packet that does not match the flow table in the kernel mode is modified so as to pass the verification. Secondly, a new custom attribute is registered in the kernel. Then, a custom jiffies attribute is added to the destination packet in a sending interface queue_userspace_packet function of the datapath upcall in the kernel mode. Finally, the packet is received in the user mode to a kernel path acceptance interface function parse_odp_packet( ), the custom attribute field of the packet is obtained and stripped, the kernel datapath upcall latency is calculated, and the packet content is restored.

The implementation of other quantity and frequency information of the datapath upcall is similar to the collection method for the kernel datapath upcall latency, and a secondary development needs to be performed on function interfaces at both ends of the kernel mode and the user mode. Since an added code is in the kernel mode, the mutual exclusion and concurrent access of statistical variables require special attention. For example, for the implementation of the collection of kernel datapath upcall packet pass count, at genlmsg_unicast( ) before a netlink data sending interface in the kernel mode, a counter used for collecting kernel datapath upcall packet pass count needs to perform an atomic autoincrement operation and be locked. For the implementation of characteristics for measuring abnormal execution states of the switch, such as kernel upcall failures count, in addition to paying attention to an atomic operation and concurrency lock handling, it is further necessary to perform special processing on the abnormal states to ensure that a kernel code can correctly handle abnormal situations. Other characteristics of the kernel upcall process are implemented in a similar way as described above.

A process of collecting characteristic data related to a kernel multi-level flow table query process includes the following.

The kernel multi-level flow table query process is the key to implementing the kernel forwarding and matching function by the OVS, and is further the most complex part of the entire kernel matching process. Because the OVS is deployed widely in network virtualization environments such as a cloud network and a data center network, with the rapid development of a cloud computing scale, people pay more attention to the forwarding efficiency of the OVS kernel. The OVS adopts the design idea of a multi-level pipeline table query, but since an OpenFlow matching domain includes all header protocol information of Layer 2 to Layer 4 networks, the flattening idea of the OpenFlow protocol for a software-defined network is most intuitively reflected in the increased explosion of the header fields of messages of the packet. The implementation of the kernel table query process has been changing from version 1.4 to version 2.14 of the OVS, but the concept of flow cache tables has been maintained in each version, and the query table acceleration is implemented through the caching mechanism.

The OVS classifies forwarding paths of the data plane into fast and slow paths. Because of a locality principle of traffic (the same as a CPU locality principle), a large number of messages continuously hit a flow table cache of the fast path. In the early days, multi-level flow tables are cached through a Microflow table and accurately matched based on hashes, and the flow table caches the table query results of consecutive hits to maintain the connection state of each flow level. Later, the OVS introduces a kernel flow table search method with a wildcard operation, and the kernel precise hash search is replaced with a Megaflow cache, reducing the frequency of sending the datapath upcall to the user mode for the search of the user mode flow table. The new version of OVS combines the Microflow and Megaflow cache table design implementations to complete a multi-level kernel table query process and mechanism with mask wildcards. A secondary development method for completing relevant characteristic collection under a multi-level mask table query architecture is introduced below.

Figure 6:
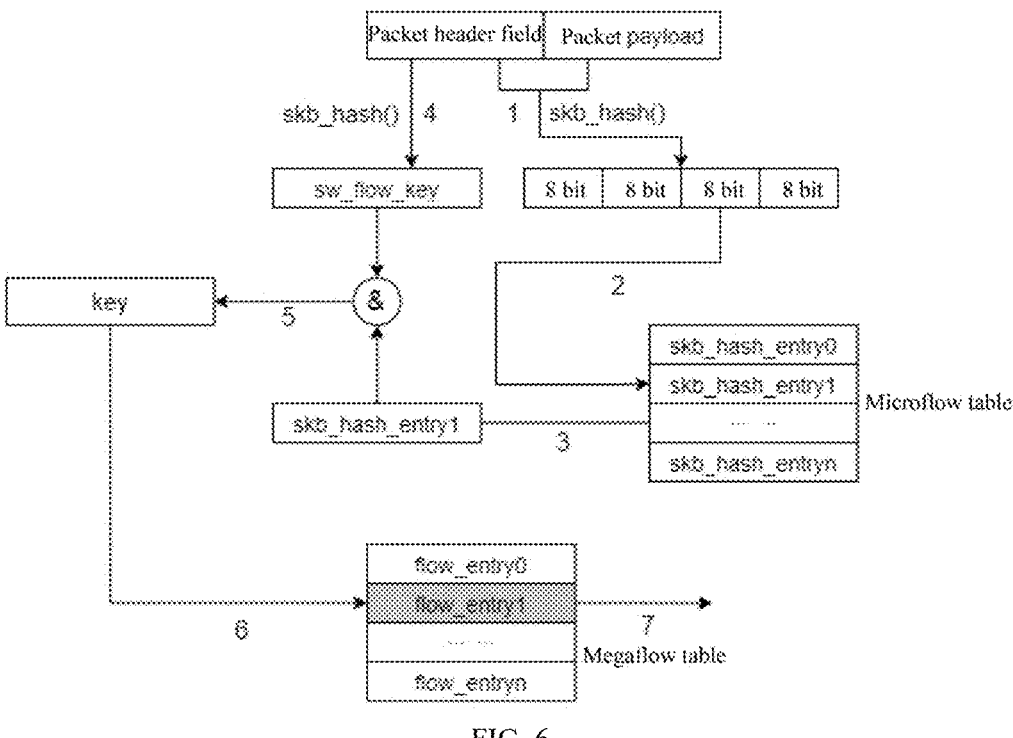
FIG. 6 is a schematic diagram of a process of flow table matching through kernel multi-level wildcards provided by an embodiment of the present disclosure.

FIG. 6 shows a diagram of a secondary development architecture, which is applicable to the kernel multi-level flow table matching process after a Linux 4.7 kernel version and an OVS 2.7 version. The packet matches the flow table in the kernel, and hash values of two parts, sw_flow_key and skb_hash_key need to be obtained first. The former is a key value obtained by hashing all the header fields of the packet, including all OpenFlow header entry fields from Layer 2 to Layer 4, through a Linux skb_hash function. The latter is a key value obtained by performing skb_hash on the entire packet, including all the header fields and all payload content fields. For the 32-bit skb_hash_key value, 8 bits are used as an index subscript each time to directly index skb_hash_entry in the Mircoflow table, the table entry is empty if a match fails, and lower 8 bits of the skb_hash_key are circulated. Then, a bitwise & operation is performed on the skb_hash_entry value indexed by the Mircoflow table and the sw_flow_key value obtained by hashing the header fields of the packet to obtain a final key value index. Finally, hash indexing is performed on the key value after the bitwise & operation in the Megaflow table, so as to find a final flow table entry in the kernel mode. As shown in FIG. 6, kernel mode mask cache hash table hit count and kernel mode mask cache hash table lookup count may be collected and obtained in a hashing and query process from skb_hash_key to the Mircoflow table in the figure. Kernel mode flow table hash table hit count and kernel mode flow table hash table lookup count may be obtained through monitoring in a final hashing process from the key to the Megaflow table. If the hash match fails finally in the preceding process, and no corresponding flow table entry in the Megaflow table is found, the packet is sent to a user mode process through the datapath upcall to search for a user mode entry, and the following involves the user mode flow table lookup time, user mode flow table entries count, and user mode flow table hit count.

As shown in process "2" in FIG. 6, kernel mode mask cache hash table lookup count counts the number of matches of the mask flow table before the mask hash table matches the interface. In the query process of 32-bit skb_hash_key, each match of an 8-bit match entry needs to be recorded and accumulated. As shown in process "3" in FIG. 6, the counter for collecting kernel mode mask cache hash table hit count records an index result of indexing the Mircoflow table with sw_flow_key as a subscript. If the table entry is empty or a direct hit fails, it is recorded as a hit failure and the counter does not perform counting. If an entry in the Mircoflow table is matched and the content is not empty, the counter adds 1. As shown in process "6" in FIG. 6, after a bitwise & operation is performed on sw_flow_key and skb_hash_entry with kernel mode flow table hash table lookup count to obtain a new index key value, the number of queries in the mask table is counted in a masked_flow_lookup interface and accumulated on the corresponding counter. As shown in process "7" in FIG. 6, kernel mode flow table hash table hit count records the hits of the hash of the key value index in the Megaflow table. This is because the Megaflow uses a chain conflict resolution method, that is, a linked list manner is used to resolve the hash conflict found in this table. When traversing all flow table entries connected to the current hash unit, the value of the corresponding counter increases only when all matching fields realize full matches and masks realize matches.

The above is the implementation of the relevant characteristics of the OVS kernel multi-level flow table query process, including kernel mode mask cache hash table hit count, kernel mode mask cache hash table lookup count, kernel mode flow table hash table hit count, and kernel mode flow table hash table lookups, which are four important characteristics that measure the matching queries and hits of the mask hash table and the flow table hash table. The above characteristics may effectively reflect the fluctuation of network traffic and the change of a traffic distribution range. When a large amount of traffic that does not conform to the traffic locality principle is required to be forwarded, the above characteristic may reflect and warn the occurrence of network abnormalities immediately. In DDOS attacks, attack means based on full connection and semi-connection, and other DDOS attack means based on a large number of short flows may all be effectively monitored and warned at the kernel and forwarding device level.

Embodiment 1

FIG. 3 shows a system architecture of the OVS software switch, which has two main layers at the system level, namely a user mode layer and a kernel datapath layer, which are responsible for the forwarding logic of the OpenFlow data plane, and correspond to two core assemblies, namely, a user mode ovs-vswitchd assembly and a kernel mode datapath assembly respectively.

The ovs-vswichd is upwardly compatible with a wide range of northbound command line interfaces, including ovs-ofctl, ovs-dpctl, ovs-appctl, etc. The ovs-ofctl is a command line interface on the control plane, which is essentially a management interface that fully supports the OpenFlow protocol to monitor and manage the data plane switch, so real-time monitoring and data collection of OVS traffic data may be implemented through this interface. The ovs-dpctl interface can be used to configure an OVS kernel mode datapath assembly, and datapaths may be created, modified, and deleted. In addition, the ovs-appctl interface can be used to query and monitor a daemon process in the OVS, and to monitor the ovs-vswitchd, datapaths, and controllers.

When a group of packets of the same type arrives at an OVS port, the packet that arrives first is processed first, an IP address and other information in a packet header are extracted, and the datapath assembly in the kernel first searches for processing rules in the cache. When the search fails, the datapath assembly sends the packet to the ovs-vswitchd assembly which stores the flow table from the controller, and the flow table is delivered to the OVS by the controller through the OpenFlow protocol. The ovs-vswitchd assembly matches the packet with the flow table one by one, finally selects the matching highest-priority flow table entry rule, and informs the datapath assembly how to handle this type of packet. The datapath assembly performs forwarding, modifying, or dropping, and other operations on this type of packet accordingly, and stores the processing rule of this type of packet in its own cache. All packets of this type received subsequently are processed according to this rule, so that the upcall ovs-vswitchd assembly does not need to perform a flow table query operation, saving processing time.

FIG. 1, FIG. 2, and FIG. 3 show an embodiment of a method for detecting network attack based on kernel operating characteristics of a software switch of the present disclosure, in which a software-defined network (SDN) with an OVS software switch as the infrastructure is constructed. The kernel operating characteristic data of the OVS is collected according to the positions shown in FIG. 3, and original characteristics are output as artificial intelligence model tensors for persistent storage through data preprocessing. Through a training test of an artificial intelligence model, the network state is depicted, and the attack behavior occurring in the network is detected. In the specific implementation of the present disclosure, the controller of the SDN network control plane is implemented based on Open-Daylight (ODL), and the switch of the data plane is implemented based on the OVS. A specific process is as follows.

Step S1, a secondary development is performed on a kernel source code of the OVS, and the kernel operating characteristic data of the software switch are obtained by adding monitoring functions to function nodes of key processes such as forwarding, table query, and controller communication of the OVS. The kernel operating characteristic data of the software switch include: kernel mode flow table lookup time, kernel mode flow table hit rate, kernel mode mask cache hash table hit count, kernel mode mask cache hash table lookup count, kernel mode flow table hash table hit count, kernel mode flow table hash table lookups, flow table command set count, flow table command get count, flow table command del count, kernel execution packet match actions count, kernel datapath upcall packet pass count, kernel datapath upcall latency, kernel upcall message average length, kernel upcall failures count, the number of packets received from a controller, the number of packets sent to a controller, execution frequency of a vswitch control, datapath upcall processing component execution frequency, user mode flow table lookup time, user mode flow table entries count, user mode flow table hit count, and kernel mode command execution failures count. The modified OVS is deployed into the SDN network.

Step S2, the second-developed OpenDaylight controller is mounted and deployed, the network operating state is monitored, and the condition of Packet in sent by the switch in the SDN network and the flow table information of the switch are counted.

Step S3, the kernel operating characteristic data of the software switch are preprocessed and persistently stored. In the example, a characteristic calculation formula is used to calculate the data, characteristics of a plurality of dimensions are integrated into a unified time scale to obtain second-level characteristic data, and the calculated characteristic data are persistently stored in a database.

Step S4, the preprocessed kernel operating characteristic data of the software switch are input into a pre-trained attack detection model to detect a potential attack behavior in a network.

Figure 7:
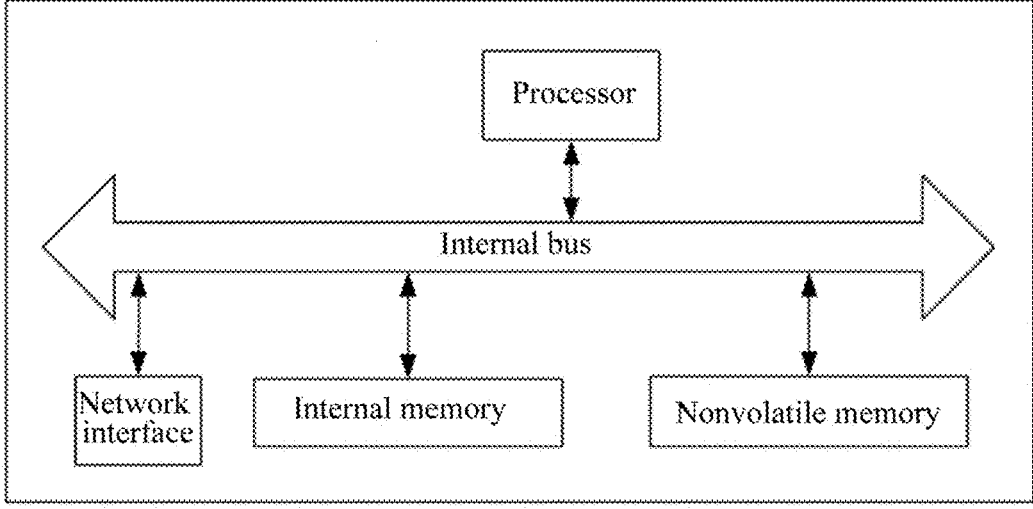
FIG. 7 is a schematic diagram of an electronic device provided by an embodiment of the present disclosure.

Accordingly, the present application further provides an electronic device, including: one or more processors; and a memory, configured to store one or more programs; and when the one or more programs are executed by the one or more processors, the one or more processors implement the method for detecting the network attack based on the kernel operating characteristics of the software switch as described above. As shown in FIG. 7, it is a hardware structure diagram of any device with a data processing capability where the method for detecting network attack based on kernel operating characteristics of a software switch is located provided by an embodiment of the present disclosure. In addition to a processor, an internal memory, and a network interface shown in FIG. 7, any device with the data processing capability where an apparatus in the embodiment is located may further include other hardware according to an actual function of any device with the data processing capability, which will not be repeated.

Accordingly, the present application further provides a non-transitory computer-readable storage medium, storing a computer instruction thereon, and the instruction, when executed by a processor, implements the method for detecting network attack based on kernel operating characteristics of a software switch as described above. The non-transitory computer-readable storage medium may be an internal storage unit of any device with the data processing capability described in any of the aforementioned embodiments, such as a hard disk or an internal memory. The non-transitory computer-readable storage medium may further be an external storage device, such as a plug-in hard disk, a smart media card (SMC), an SD card and a flash card, arranged on the device. Further, the non-transitory computer-readable storage medium can further include both the internal storage unit of any device with the data processing capability and the external storage device. The non-transitory computer-readable storage medium is used for storing the computer program and other programs and data required by any device with the data processing capability, and may further be used for temporarily storing data that has been outputted or will be outputted.

Those skilled in the art will easily think of other implementation solutions of the present application after the consideration of the specification and practice of the content disclosed herein. The present application is intended to cover any variation, use, or adaptation of the present application that follows the general principles of the present application and includes common knowledge or customary technical means in the technical field that are not disclosed in the present application. The specification and embodiments are considered exemplary only.

It should be understood that the present application is not limited to the exact construction that has been described above and illustrated in the drawings, and that various modifications and changes may be made without departing from its scope.

What is claimed is:

1. A method for detecting network attack based on kernel operating characteristics of a software switch comprising:

collecting kernel operating characteristic data of the software switch by adding monitoring functions to function nodes of key processes such as forwarding, table lookup and controller communication of the software switch, wherein the kernel operating characteristic data of the software switch in a cycle time comprise: kernel mode flow table lookup time, kernel mode flow table hit rate, kernel mode mask cache hash table hit count, kernel mode mask cache hash table lookup count, kernel mode flow table hash table hit count, kernel mode flow table hash table lookup count, flow table command set count, flow table command get count, flow table command del count, kernel execution packet match actions count, kernel datapath upcall packet pass count, kernel datapath upcall latency, kernel upcall message average length, kernel upcall failures count, a number of packets received from a controller, a number of packets sent to the controller, user mode main control execution frequency, datapath upcall processing component execution frequency, user mode flow table lookup time, user mode flow table entries count, user mode flow table hit count, and kernel mode command execution failures count;

periodically delivering the collected kernel operating characteristic data of relative software switches in a network to an attack detection server specified by the controller for storing and further processing;

preprocessing the kernel operating characteristic data of software switches in the attack detection server, comprising: calculating the kernel operating characteristic data using feature calculation formula, integrating features of multiple dimensions into a unified time scale to obtain second-level feature data, and storing the calculated second-level feature data in a database;

training different deep learning-based attack detection models for achieving different detection purposes using the preprocessed kernel operating characteristic data of the software switches;

after the training process is completed, inputting the collected and preprocessed kernel operating characteristic data of relative software switches into a corresponding trained deep learning-based attack detection model in real time, wherein owing to these extra effective data, the trained deep learning-based attack detection model is more precise and fast to detect an attack when compared with traditional detection models; and after the attack is detected, through the attack detection server or the network controller, immediately requiring those involved software switches to conduct countermeasures for intercepting the attack, and notifying a network manager to effectively respond to the attack at the same time.

2. The method for detecting the network attack based on the kernel operating characteristics of the software switch according to claim 1, wherein the kernel operating characteristic data of the software switch specifically comprise:

the kernel mode flow table lookup time refers to a time taken for each packet to lookup a kernel mode flow table within a kernel datapath per unit of time;

the kernel mode flow table hit rate refers to a number of packets that hit the kernel mode flow table within the kernel datapath per unit of time;

the kernel mode mask cache hash table hit count refers to a number of hits in a kernel mode mask cache hash table for the packets per unit of time;

the kernel mode mask cache hash table lookup count refers to a number of lookups in the kernel mode mask cache hash table for the packets per unit of time;

the kernel mode flow table hash table hit count refers to a number of hits in a kernel mode flow table hash table for the packets per unit of time;

the kernel mode flow table hash table lookup count refers to a number of lookups to the kernel mode flow table hash table for the packets per unit of time;

the flow table command set count refers to a number of times an Open vSwitch (OVS) executes flow table setting operations per unit of time;

the flow table command get count refers to a number of times the OVS executes flow table getting operations per unit of time;

the flow table command del count refers to a number of times the OVS executes flow table deleting operations per unit of time;

the kernel execution packet match actions count refers to a number of times an OVS kernel executes packet matching actions per unit of time;

the kernel datapath upcall packet pass count refers to a number of packets transmitted by an OVS kernel datapath upcall per unit of time;

the kernel datapath upcall latency refers to an average delay of the packets transmitted by the OVS kernel datapath upcall per unit of time;

the kernel upcall message average length refers to an average length of the packets transmitted by the OVS kernel datapath upcall per unit of time;

the kernel upcall failures count refers to a number of failures in sending upcall packets from a kernel mode to a user mode per unit of time;

the number of packets received from the controller refers to a number of instruction packets received by OVS from a control plane per unit of time, wherein the instruction packets comprise all packet_out packets;

the number of packets sent to the controller refers to a number of packets sent by the OVS to the controller per unit of time, comprising all packet_in packets;

the user mode main control execution frequency refers to an execution frequency of a main process of a user mode main control per unit of time;

the datapath upcall processing component execution frequency refers to an execution frequency of a management process for sending from the kernel mode to the user mode per unit of time;

the user mode flow table lookup time refers to an average query time of a user mode flow table per unit of time;

the user mode flow table entries count refers to an average number of flow table entries in the user mode flow table per unit of time;

the user mode flow table hit count refers to a number of hits in the user mode flow table per unit of time; and the kernel mode command execution failures count refers to a number of execution failures of commands sent from the user mode to the kernel mode per unit of time.

3. The method for detecting the network attack based on the kernel operating characteristics of the software switch according to claim 1, wherein the flow table command get count is greater than the flow table command set count; and the flow table command del count is much smaller than the flow table command set count and the flow table command get count.

4. The method for detecting the network attack based on the kernel operating characteristics of the software switch according to claim 1, wherein acquiring the kernel datapath upcall latency comprises:

the packets matching partial flow tables cached in the kernel mode when entering the software switch, uploading the packets to a complete flow table in the user mode for matching when the packets do not match the flow table cached in the kernel mode, in order to collect a packet datapath upcall latency, expanding a content of the packets before uploading to the user mode, and adding information of a current timestamp; reading and calculating the expanded and added content after the packets arriving at a user mode process; and restoring an expansion field of the packets to an original data format state of the packets, thereby counting latency of a target packet passing through a datapath upcall.

5. The method for detecting the network attack based on the kernel operating characteristics of the software switch according to claim 1, wherein a collection process of the kernel operating characteristic data, comprising the kernel mode mask cache hash table hit count, the kernel mode mask cache hash table lookup count, the kernel mode flow table hash table hit count, and the kernel mode flow table hash table lookups, related to table lookup processes of kernel multi-level flow tables comprises:

in a multi-level masktable lookup architecture that combines Microflow and Megaflow cache tables, when the packets matching the flow table in the kernel mode, acquiring two kinds of packet hash values, namely a first hash value sw_flow_key and a second hash value skb_hash_key, wherein the first hash value sw_flow_key represents a key value obtained by hashing all header fields of the packets using a Linux skb_hash function, and the second hash value skb_hash_key represents a key value obtained by performing skb_hash on the entire packets, comprising all the header fields and all payload content fields;

for the second hash value skb_hash_key, directly indexing skb_hash_entry in a Mircoflow table using 8 bits as an index subscript each time, and when matching being failed and a table entry being empty, and circulating lower 8 bits of the second hash value skb_hash_key;

performing a bitwise & operation on a skb_hash_entry value indexed by the Mircoflow table and a sw_flow_key value obtained by hashing the header fields of the packets to obtain an index of a final key value;

performing hash indexing on the final key value after the bitwise & operation in the Megaflow table, to find a final flow table entry in the kernel mode;

collecting and acquiring the kernel mode mask cache hash table hit count and the kernel mode mask cache hash table lookup count in a hashing and lookup process from the skb_hash_key to the Mircoflow table;

monitoring and acquiring the kernel mode flow table hash table hit count and the kernel mode flow table hash table lookup count in a hashing process from a final key to the Megaflow table; and when hash matching fails finally in the preceding process, and a corresponding flow table entry in the Megaflow table is not found, sending the packets to a user mode process through the datapath upcall to look up a user mode entry, to collect three characteristics of the user mode flow table lookup time, the user mode flow table entries count, and the user mode flow table hit count.

6. An electronic device comprising a memory and a processor, wherein the memory is coupled with the processor, and wherein the memory is configured to store program data, and the processor is configured to execute the program data to implement the method for detecting the network attack based on the kernel operating characteristics of the software switch according to claim 1.

7. A non-transitory computer-readable storage medium storing a computer program/instruction, wherein the computer program/instruction, when executed by a processor, is configured to implement the method for detecting the network attack based on the kernel operating characteristics of the software switch according to claim 1.

* * * * *